July 12, 1932.  E. S. REILAND ET AL  1,866,907

PISTON AND RING

Filed Feb. 19, 1927

Inventor
Ernest S. Reiland
Peter M. Reiland
By Horace Fisch
Attorney

Patented July 12, 1932

1,866,907

UNITED STATES PATENT OFFICE

ERNEST S. REILAND AND PETER M. REILAND, OF ST. PAUL, MINNESOTA

PISTON AND RING

Application filed February 19, 1927. Serial No. 169,457.

Our invention relates to improvement in pistons and rings wherein it is designed to provide a piston with a solid skirt structure and with a peculiarly designed piston ring and means to prevent piston slap when the piston is unexpanded or cold.

Our invention includes a special designed ring which compensates for the expansion and contraction of the piston. This is an important feature of our invention. The piston and rings are made to stand a great expansion and contraction which is apparent in aluminum alloy pistons. It is also a feature of our invention to provide piston rings having such beveled construction or faces as to provide ring means which do not have a heavy pressure or frictional contact with the cylinder walls. These specially constructed rings permit the piston to be fit in the cylinder comparatively free with sufficient amount of clearance for expansion and yet the rings provide the necessary means for giving the proper fit to hold the piston in position and to permit the same to run freely in the cylinder.

It is a feature of our invention to provide self-adjusting ring means which co-act with the bearing ring in a manner to automatically adjust the bearing rings of the piston to the cylinder walls.

The invention includes a special means of providing bearing rings for carrying the piston and follower rings which are adapted to hold the bearing rings in position to properly support the piston in the cylinder. By suitable spring means the follower rings are held in a manner to automatically adjust the bearing rings. This permits the free fitting of the piston in the cylinder and prevents wear of the piston, overcoming piston clearance slap and providing a very desirable structure to form the necessary oil seal on the wall of the piston and to give the proper compression in the cylinder. In fact, we have found our pistons to give a more uniform compression in each cylinder and to hold the compression above the piston longer than the ordinary well known structures of pistons and rings heretofore used.

These features and others will be more fully and clearly set forth in the specification and claims.

In the drawing forming part of this specification:

Figure 1:
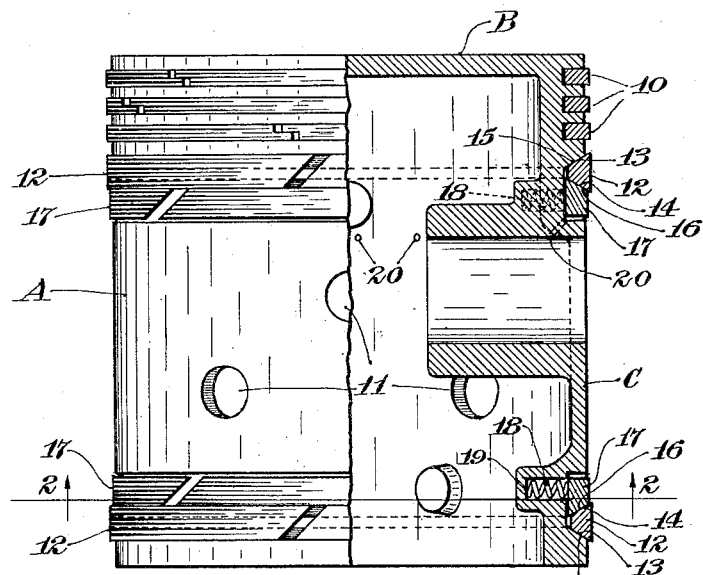
Figure 1 is a side view partly in section showing an approximate half of the cylinder cut away.

In the drawing our piston A is made of aluminum or other suitable alloyed material of a light weight having a head portion B, with an undivided skirt C.

The head portion B is adapted to carry the ordinary compression rings 10 which are positioned adjacent each other in a manner to provide the compression rings at the top of the piston A.

The skirt C is formed with openings 11 which permit the oil which works up along the skirt of the piston to be passed through the piston freely, and these openings also permit the oil from the crank case to pass through to the wall of the cylinder between the bearing rings 12.

Figure 2:
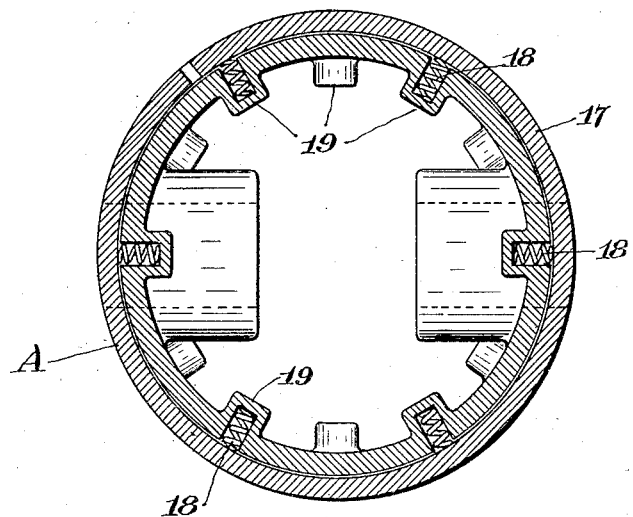
Figure 2 is a section on the line 2—2 of Figure 1.

In carrying out our invention we position one bearing ring 12 just below the compression rings 10. The ring 12 is formed with inner beveled surfaces 13 and 14, the beveled surface 13 being adapted to bear against the beveled surface 15 formed in the piston A, while the beveled surface 14 is adapted to bear against a beveled surface 16 formed on the follower ring 17. The follower ring 17 is adapted to be pressed outwardly by the coil springs 18 which are positioned in the sockets 19 formed projecting inwardly in the body of the cylinder A. We provide a series of sockets 19 about the circumference of the cylinder A, as illustrated in Figure 2. In this manner a uniform spring pressure is exerted against the follower ring 17 which bears against the beveled surface 14 of the ring 12 in a manner to cause the ring 12 to expand against the cylinder wall when the piston is in operation, thereby compensating for inequalities and for wear and providing a bearing ring 12 which holds the piston A centered in the cylinder and prevents the same from piston clearance slap in operation.

We provide a bearing ring 12 in the skirt of the piston which is of the same construction as that positioned directly below the compression rings 10. In this manner by means of the upper and lower bearing rings as illustrated in Figure 1, and by means of the follower compensating rings 17 the bearing rings 12 are automatically held in operative position to guide the piston in its operation and permit it to reciprocate very freely with a small amount of frictional contact on the cylinder walls, yet providing a means of increasing the compression at the head B of the piston and controlling the oil between the bearing rings 12.

We also provide drain holes 20 through the piston from the upper ring groove which carries the follower ring 17. This permits the surplus oil which may work up the piston and back of the ring to drain back into the crank case through the piston.

It is desirable in internal combustion engines to provide a piston of a comparatively light weight and having a strong body portion. In making such a piston of aluminum and alloy it is generally recognized in the trade that the skirt of the piston must be split to permit the expansion and contraction of the same without binding on the cylinder walls. In a piston of this nature, after the piston has become somewhat worn in operation a piston clearance slap is apparent and this is undesirable in an automobile or internal combustion engine. A feature of our invention is to overcome these undesirable features and to provide a piston with a body which is undivided of a light weight and having bearing rings which center the piston in the cylinder and which are provided with means for automatically compensating for the wear and the movement of the piston in operation so as to permit the piston to reciprocate very freely in the cylinder. We have found in actual use that our piston runs very freely in the cylinder with practically a minimum friction on the side walls of the cylinder and yet we provide a piston having means for holding the compression better than other pistons now in use, in so far as we know.

The beveled surfaces 15 in the piston body engage the beveled surfaces 13 of the ring 12 to permit the ring to slide on the beveled surface 15. The opposite beveled surfaces 14 of the ring 12 engage with the beveled surface 16 of the follower ring 17, while the coil springs 18 press against the follower springs in a manner to force the follower ring outwardly, thereby having a tendency to expand the ring 12 against the cylinder wall. This permits for compensation in the reciprocation of the piston A, the ring 12 working between two beveled surfaces, one of which is rigid and the other being resilient through the actions of the coil springs 18. This structure provides a means for supporting the piston A in a very practical manner with very desirable results as we have accomplished in tests which we have made and which we believe has not been accomplished heretofore. The ring 12 may be compressed against the spring tension of the springs 18 and the follower ring 17 to the desired extent in a manner to permit the piston A and bearing rings 12 to fit properly in the cylinder in which the piston is placed. The cylinder is not illustrated, either in part or in its entirety in the drawing as this is of common ordinary well known construction and it is understood that the rings 12 and 17 are fit in a manner to compensate for the action hereinbefore described to permit the piston and rings to function in use in the cylinder of the internal combustion engine.

In accordance with the patent statutes we have described the principles of our invention, together with the best embodiment thereof which we have endeavored to illustrate in the drawing, but we desire to have it understood that the illustrations are only suggestive of a means of carrying out our invention and that the same may be carried out by other structure and means without departing from the spirit of our invention within the scope of the following claims.

We claim:

1. A piston and bearing ring including, a piston body, a groove formed in said piston body, a beveled surface on one side of said groove and a rectangular corner on the other side, a bearing ring having oppositely disposed beveled surfaces, one of which is adapted to bear against the beveled surface in said groove, a follower compensating ring, a beveled surface on said follower ring for engaging one of the beveled surfaces of said bearing ring, and a series of resilient means circumferentially disposed adapted to expand said follower ring outwardly.

2. A piston having a body portion, a groove formed in said piston having a beveled surface on one side and a rectangular corner on the other side, a bearing ring having inwardly beveled surfaces formed thereon, one of said beveled surfaces engaging said beveled surface formed in the piston, a follower ring having a beveled surface on one side and a rectangular edge on the other side, said rectangular surface capable of engaging the rectangular surface formed in the piston, and spring means in said piston adapted to bear against the back of said follower ring in a manner to cause said follower ring to operate against said bearing ring to provide a compensating bearing and sealing joint in the wall of said piston.

3. In a piston adapted for use in an internal combustion engine, an undivided body portion, said body portion having a groove formed therein and adapted to receive a bearing ring having oppositely disposed beveled surfaces and a follower ring having a complementary beveled surface on one side and a rectangular corner on the other side thereof, said groove having a beveled surface on one side and a rectangular corner on the other side.

4. A piston, comprising a body portion, said body portion having a plurality of grooves formed therein adapted to receive bearing rings having oppositely disposed beveled surfaces, each of said grooves having a beveled surface on one side against which said bearing ring may fit a rectangular corner on the other side, and a follower ring between said bearing ring and said rectangular corner.

ERNEST S. REILAND.
PETER M. REILAND.